United States Patent
Ottinger et al.

(10) Patent No.: US 10,082,062 B2
(45) Date of Patent: Sep. 25, 2018

(54) SYSTEMS AND METHODS FOR ENHANCING CATALYTIC EFFICIENCY OF SCR CATALYSTS

(71) Applicant: Cummins Emission Solutions, Inc., Columbus, IN (US)

(72) Inventors: Nathan A. Ottinger, Madison, WI (US); Z. Gerald Liu, Madison, WI (US); Yuanzhou Xi, Verona, WI (US); Rebecca A. Veele, Madison, WI (US); Changsheng C. Su, Columbus, IN (US); Niklas Schmidt, Madison, WI (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 15/567,029

(22) PCT Filed: Apr. 18, 2016

(86) PCT No.: PCT/US2016/028099
§ 371 (c)(1),
(2) Date: Oct. 16, 2017

(87) PCT Pub. No.: WO2016/172040
PCT Pub. Date: Oct. 27, 2016

(65) Prior Publication Data
US 2018/0135489 A1 May 17, 2018

Related U.S. Application Data

(60) Provisional application No. 62/150,641, filed on Apr. 21, 2015.

(51) Int. Cl.
*F01N 3/028* (2006.01)
*F01N 3/20* (2006.01)
(Continued)

(52) U.S. Cl.
CPC ......... *F01N 3/208* (2013.01); *B01D 53/9418* (2013.01); *B01J 29/76* (2013.01);
(Continued)

(58) Field of Classification Search
CPC .. F01N 3/208; F01N 2370/04; F01N 2610/12; B01D 2255/50; B01D 2255/20761
(Continued)

(56) References Cited

U.S. PATENT DOCUMENTS 4,615,991 A * 10/1986 Obayashi ........... B01D 53/8625
423/239.1
5,015,611 A  5/1991 Clark
(Continued)

FOREIGN PATENT DOCUMENTS

CN  102974404  3/2013
JP  2014-84822  5/2014
(Continued)

OTHER PUBLICATIONS

International Search Report and Written Opinion issued for PCT/US2016/028099 dated Jul. 29, 2016, 8 pages.

*Primary Examiner* — Tom P Duong
(74) *Attorney, Agent, or Firm* — Foley & Lardner LLP (57) ABSTRACT

A method for increasing a catalytic efficiency of a catalyst, comprising providing a catalyst. Finally, the catalyst is installed into a selective catalytic reduction system of an aftertreatment system configured to reduce constituents of an exhaust gas generated by an engine. The catalyst is soaked in a liquid which consists essentially of one of water or a water-comprising solution. The soaking occurs at least one of before or after installing the catalyst in the selective catalytic reduction system. The catalyst can include a copper zeolite catalyst.

24 Claims, 5 Drawing Sheets

(51) Int. Cl.
  *B01J 29/76* (2006.01)
  *B01J 37/06* (2006.01)
  *B01D 53/94* (2006.01)
(52) U.S. Cl.
  CPC ..... *B01J 37/06* (2013.01); *B01D 2255/20761* (2013.01); *B01D 2255/50* (2013.01); *F01N 2370/04* (2013.01); *F01N 2610/12* (2013.01)
(58) Field of Classification Search
  USPC .......................................................... 422/168
  See application file for complete search history.

(56) References Cited

U.S. PATENT DOCUMENTS

| | | | | |
|---|---|---|---|---|
| 5,308,810 | A * | 5/1994 | Voss | B01D 53/8628 423/239.1 |
| 2001/0006929 | A1 | 7/2001 | Budin et al. | |
| 2006/0058176 | A1 * | 3/2006 | Shirakura | B01D 53/8625 502/22 |
| 2008/0156354 | A1 * | 7/2008 | Mackey | B01D 53/8696 134/22.18 |
| 2009/0233786 | A1 * | 9/2009 | Hartenstein | B01D 53/8625 502/25 |
| 2009/0233787 | A1 * | 9/2009 | Hartenstein | B01J 21/20 502/25 |
| 2010/0322833 | A1 * | 12/2010 | Cheng | B01D 53/9418 423/213.5 |
| 2011/0138789 | A1 | 6/2011 | Chapman | |
| 2014/0065041 | A1 | 3/2014 | Szailer et al. | |
| 2015/0072855 | A1 | 3/2015 | Yezerets et al. | |

FOREIGN PATENT DOCUMENTS

| | | |
|---|---|---|
| WO | WO-2013/147653 | 10/2013 |
| WO | WO-2014/109729 | 7/2014 |

* cited by examiner

SYSTEMS AND METHODS FOR ENHANCING CATALYTIC EFFICIENCY OF SCR CATALYSTS

CROSS REFERENCE TO RELATED APPLICATIONS

The present application is a National Stage of PCT Application No. PCT/US2016/028099, filed Apr. 18, 2016, which claims the benefit of priority to U.S. Provisional Patent Application No. 62/150,641, filed Apr. 21, 2015. The contents of both applications are herein incorporated by reference in their entirety and for all purposes.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst configured to convert NOx (NO and $NO_2$ in some fraction) into harmless nitrogen gas ($N_2$) and water vapor ($H_2O$) in the presence of ammonia ($NH_3$). Generally, in such conventional aftertreatment systems, an exhaust reductant, (e.g., a diesel exhaust fluid such as urea) is injected into the aftertreatment system to provide a source of ammonia, and mixed with the exhaust gas to partially reduce the NOx gases.

The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems. The percentage of the NOx gases or other constituents in a given volume of the exhaust gas which are decomposed into the harmless byproducts after flowing through the aftertreatment system depends on a catalytic efficiency of the catalyst. The higher the catalytic efficiency, the higher the percentage of NOx gases converted into harmless byproducts. Increasingly stringent emission requirements demand that the catalyst of the SCR system have higher catalytic efficiency to meet and exceed the emission requirements.

SUMMARY

Embodiments described herein relate generally to systems and methods for improving NOx conversion efficiency of aftertreatment systems and in particular, to methods of soaking a catalyst or a catalyst assembly in which the catalyst is included, with a liquid consisting essentially of water or a water-comprising solution before installing in an aftertreatment system, after installing in the aftertreatment system and/or during an operation of the aftertreatment system to improve a catalytic efficiency thereof.

In a first set of embodiments, a method for increasing a catalytic efficiency of a catalyst comprises providing a catalyst. The catalyst is installed into a SCR system of an aftertreatment system configured to reduce constituents of an exhaust gas generated by an engine. The catalyst is soaked in a liquid. The liquid consists essentially of water or a water-comprising solution. The soaking occurs at least one of before or after installing the catalyst into the SCR system. In one embodiment, the catalyst includes a copper zeolite catalyst.

In another set of embodiments, an aftertreatment system comprises a selective catalytic reduction system comprising a catalyst assembly installed therein. The catalyst assembly comprises a catalyst configured to decompose constituents of an exhaust gas flowing through the aftertreatment system. The aftertreatment system also comprises a liquid insertion assembly configured to deliver a liquid to the catalyst, the liquid consisting essentially of water or a water-comprising solution. A controller is operatively coupled to the liquid insertion assembly. The controller is configured to instruct the liquid insertion assembly to soak the catalyst with the liquid at least one of before or after installing the catalyst assembly in the aftertreatment system.

In yet another set of embodiments, an apparatus comprises a selective catalytic reduction system structured to be operatively coupled to an aftertreatment system. The selective catalytic reduction system comprises a housing defining an inlet and an outlet. A catalyst assembly is installed in the housing. The catalyst assembly comprises a catalyst configured to decompose constituents of an exhaust gas. The catalyst comprises a liquid soaked catalyst. The liquid in which the catalyst is soaked consists essentially of one of water or a water-comprising solution.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for improving NOx conversion efficiency of aftertreatment systems and in particular, to methods of soaking a catalyst assembly with a liquid consisting essentially of one of water or a water-comprising solution before installing in an aftertreatment system, after installing in the aftertreatment system and/or during an operation of the aftertreatment system to improve a catalytic efficiency thereof.

Various embodiments of the systems and methods for improving a catalytic efficiency of a catalyst included in a catalyst assembly of an aftertreatment system may provide numerous benefits including, for example: (1) improving a catalytic efficiency of a catalyst included in the catalyst assembly by soaking the catalyst or the catalyst assembly in a liquid consisting essentially of one of water or a water-comprising solution; (2) preventing leaching of copper from a copper zeolite (CuZ) catalyst which can occur if the CuZ catalyst is soaked with an exhaust reductant such as a DEF before being soaked in the liquid; and (3) allowing improvement of catalytic efficiency of catalysts included in conventional catalyst assemblies without any substantial increase in cost or complications in manufacturing of the catalyst assembly.

As used herein, "the liquid consisting essentially of water" means that the liquid may consist essentially of water to which no external additives have been added in measurable quantities so as to affect the improvement in catalytic efficiency of the catalyst after soaking. Furthermore, the liquid may consist essentially of a water-comprising solution which may include a water based solution which may comprise water in any suitable volumetric percentage (e.g., in the range of 1% to 99% by volume). Non-limiting examples of such a water-comprising solution comprises aqueous solution including a predetermined amount of minerals, salts, electrolytes, aqueous acidic or basic solutions, and/or aqueous solutions of active catalyst components.

Figure 1:
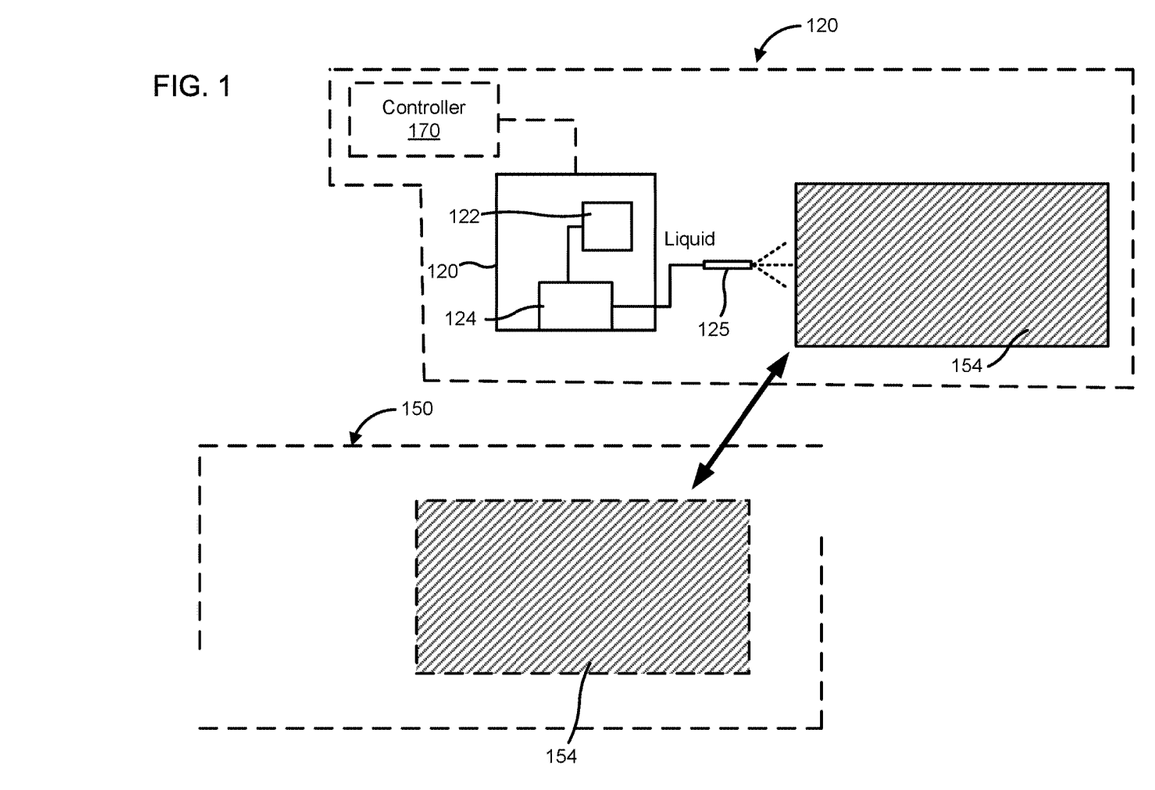
FIG. 1 is a schematic block diagram of a liquid insertion assembly, according to one embodiment, that can be used to soak a catalyst assembly including a catalyst disposed therein.

FIG. 1 is a schematic illustration of a liquid insertion assembly 120 according to a first set of embodiments that can be used to insert, spray or otherwise dispense a liquid on a catalyst or a catalyst assembly 154 including the catalyst so as to soak the catalyst disposed therein. The liquid consists essentially of one of water or a water-comprising solution, as previously described herein. The catalyst assembly 154 can be removably positioned in an SCR system 150, described in further detail herein. As represented in FIG. 1, a new catalyst or a catalyst assembly 154 is positioned in the liquid insertion assembly 120 and soaked with the liquid. The soaked catalyst assembly 154 is then installed in the SCR system 150, for example, after allowing the catalyst assembly 154 to dry. In other embodiments, a used catalyst assembly 154 can be removed from the SCR system 150 and positioned in the liquid insertion assembly 120 for soaking with the liquid. In particular embodiments, the used catalyst assembly 154 may be removed from the SCR system 150, and the catalyst removed therefrom. The catalyst (e.g., a catalyst monolith) may then be positioned in the liquid insertion assembly 120 so as to soak the catalyst with the liquid. The soaked catalyst assembly 154 can then be removed from the liquid insertion assembly 120 and reinstalled in the SCR system 150. In still other embodiments, a catalyst material (e.g., a powdered catalyst formulation) can also be positioned in the liquid insertion assembly 120 and soaked with the liquid to achieve an improvement in NOx conversion efficiency of the catalyst prior to incorporating the catalyst in the catalyst assembly 154.

The catalyst assembly 154 includes at least one catalyst formulated to selectively reduce constituents of the exhaust gas, for example, NOx included in the exhaust gas in the presence of an exhaust reductant. Any suitable catalyst can be used such as, for example, platinum, palladium, rhodium, cerium, iron, manganese, copper, vanadium based catalysts (including combinations thereof). In one embodiment, the catalyst includes a zeolite based catalyst such as a CuZ catalyst. Such zeolite catalysts can include copper and/or other materials such as aluminum, boron, calcium, iron, magnesium, molybdenum, sodium, lead, silicon (e.g., silicates), zinc, any other materials or combinations thereof incorporated into the catalyst composition.

The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials can include, for example, aluminum oxide, titanium dioxide, silicon dioxide, any other suitable washcoat material, or a combination thereof. The exhaust gas can flow over and about the catalyst such that any NOx gases included in the exhaust gas are further reduced to yield an exhaust gas which is substantially free of NOx gases.

The liquid insertion assembly 120 includes a liquid storage tank 122 and a pumping assembly 124 configured to pump or otherwise insert the liquid onto the catalyst assembly 154 via a liquid dispenser 125 (e.g., a nozzle or a sprayer). The pumping assembly 124 can include a pump, valves, timers or other components configured to insert the liquid onto the catalyst assembly 154. In some embodiments, the liquid inserted onto the catalyst assembly 154 consists essentially of water. In such embodiments, the water may include regular tap water, deionized water, and/or filtered water. In yet other embodiments, the liquid may consist essentially of a water-comprising solution. The water-comprising solution can include a predetermined amount of minerals, salts, electrolytes, aqueous acidic or basic solutions, and/or aqueous solutions of active catalyst components which can contribute towards enhancing the catalytic efficiency of the catalyst.

In some embodiments, the liquid insertion assembly 120 can include a housing (not shown) within which the catalyst assembly 154 can be positioned to perform the soaking with the liquid. In other embodiments, the liquid insertion assembly 120 can include an open container within which the catalyst assembly 154 is placed. The liquid insertion assembly 120 can be configured to fill the container such that the catalyst assembly 154 is submerged or otherwise bathed with the liquid. In particular embodiments, the catalyst (e.g., a catalyst monolith) included in the catalyst assembly 154 may be immersed in a bath of the liquid so as to soak the catalyst. The soaked catalyst may then be integrated into the catalyst assembly 154 before installing the catalyst assembly 154 in the SCR system 150.

Soaking the catalyst with the liquid increases the catalytic efficiency of the catalyst, for example, by enhancing the surface area of the catalyst, altering the grain structure of the catalyst, modifying the location of active catalyst components and/or improving the binding of the catalyst. The soaking with the liquid however, does not cause significant leaching of copper included in the CuZ catalyst which can be included in the catalyst. Thus, loss of catalytic activity which can occur if the catalyst is soaked or wetted with other liquids (e.g., liquid exhaust reductant) is prevented.

As described above, the liquid insertion assembly 120 can be configured to soak the catalyst assembly 154 (or otherwise the catalyst) with the liquid soon before the catalyst assembly 154 has ever been used for decomposing constituents of the exhaust gas. In other words, the catalyst assembly 154 is soaked with the liquid before it is installed for a first time in the SCR system 150, for example, as received from a manufacturer. In particular embodiments, the initial soaking of the catalyst assembly 154 with the liquid by the liquid insertion assembly 120 can sufficiently enhance the catalytic efficiency of the catalyst such that subsequent soaking of the catalyst assembly 154 with the liquid may not be performed.

A controller 170 can optionally be in electrical communication with the liquid insertion assembly 120 and configured to command the liquid insertion assembly 120 to insert the liquid onto the catalyst assembly 154. For example, the controller 170 can be configured to determine if a new or otherwise fresh catalyst assembly 154 is positioned in the liquid insertion assembly 120, and in response to the new catalyst assembly 154 being positioned, command the liquid insertion assembly 120 to insert the liquid onto the catalyst assembly 154 for soaking the new catalyst assembly 154 and thereby, the catalyst included therein. The controller 170 is described in further detail herein with reference to FIG. 2 and FIG. 5.

Figure 2:
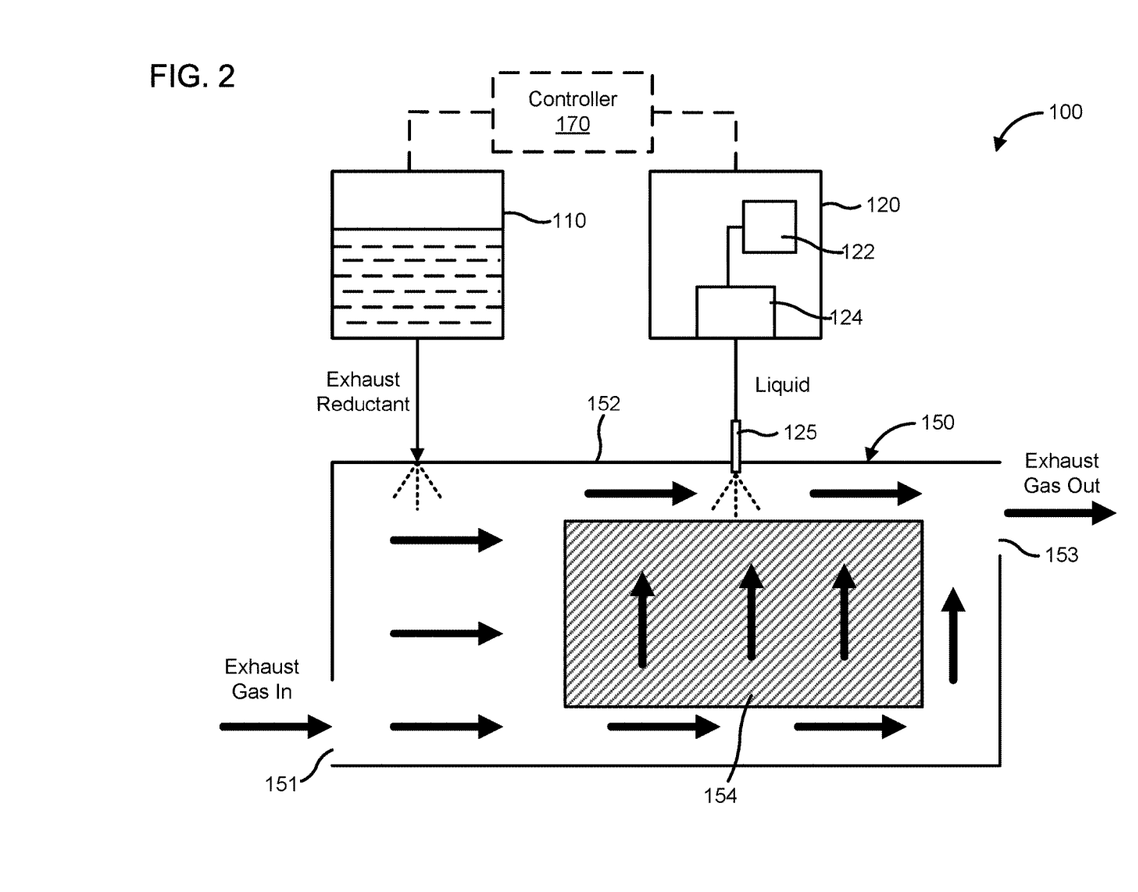
FIG. 2 is a schematic block diagram of an aftertreatment system which includes the liquid insertion assembly of FIG. 1, according to an embodiment.

In another set of embodiments, the liquid insertion assembly 120 can be integrated into an aftertreatment system, and configured to insert the liquid into an SCR system of the aftertreatment system for soaking a catalyst assembly positioned therein. For example, FIG. 2 is a schematic illustration of an aftertreatment system 100, according to an embodiment. The aftertreatment system 100 is configured to receive an exhaust gas (e.g., a diesel exhaust gas) from an engine (e.g., a diesel engine) and reduce constituents of the exhaust gas such as, for example, NOx gases, etc. The aftertreatment system 100 includes a reductant storage tank 110, the liquid insertion assembly 120, the SCR system 150 and optionally, the controller 170.

The reductant storage tank 110 contains an exhaust reductant formulated to facilitate decomposition of the constituents of the exhaust gas (e.g., NOx gases) by a catalyst included in a catalyst assembly 154 installed in the SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the tradename ADBLUE®).

The SCR system 150 is configured to receive and treat the exhaust gas (e.g., a diesel exhaust gas) flowing through the SCR system 150. The SCR system 150 is fluidly coupled to the storage tank 110 to receive the exhaust reductant from the storage tank 110. The SCR system 150 includes a housing 152 defining an inlet 151 for receiving the exhaust gas from an engine, and an outlet 153 for expelling treated exhaust gas. The catalyst assembly 154 is installed in the housing 152 of the SCR system 150. The catalyst included in the catalyst assembly 154 is configured to decompose constituents of the exhaust gas (e.g., NOx gases) in the presence of an exhaust reductant (e.g., an aqueous urea solution).

The liquid insertion assembly 120 is fluidly coupled to the housing 152 of the SCR system 150 and configured to insert the liquid into the SCR system 150 to soak the catalyst assembly 154 and thereby the catalyst with the liquid. The liquid insertion assembly 120 is configured to soak the catalyst assembly 154, and thereby the catalyst, with the liquid soon before the catalyst assembly 154 has ever been used for decomposing constituents of the exhaust gas. In other words, the catalyst assembly 154 is soaked with the liquid when it is freshly installed in the SCR system 150, for example, as received from a manufacturer and before an exhaust gas is flown through the aftertreatment system 100 for the first time. In various embodiments, the soaking with the liquid, for example, immersion in the liquid, sprinkling, spraying, or otherwise wetting with the liquid does not result in leakage of copper or other components included in the catalyst as described herein from leaching from the catalyst.

In other embodiments, the liquid insertion assembly 120 is also configured to insert (e.g., spray, sprinkle or otherwise flow) the liquid into the SCR system 150 to soak the catalyst assembly 154 and wet the catalyst at predetermined time intervals. For example, the liquid insertion assembly 120 can initially soak the catalyst assembly 154 with the liquid before use of the catalyst assembly 154 for treating the exhaust gas for the first time. The liquid insertion assembly 120 can then be configured to insert the liquid at regular predetermined intervals into the SCR system 150, for example, after predetermined hours of operation, after each fuel refill of an engine (e.g., a diesel engine) with which the aftertreatment system 100 is associated, or whenever a new catalyst assembly is installed in the aftertreatment system 100. In particular embodiments, the soaking with the liquid at the predetermined time intervals can also serve to regenerate the catalyst.

The controller 170 can be in electrical communication with the liquid insertion assembly 120 and configured to command the liquid insertion assembly 120 to insert the liquid into the SCR system 150. For example, the controller 170 can be configured to determine if a new or otherwise fresh catalyst assembly 154 is inserted into the SCR system 150, and in response to the new catalyst assembly 154 being inserted, command the liquid insertion assembly 120 to insert the liquid into the SCR system 150 for soaking the new catalyst assembly 154 and thereby, the catalyst included therein.

In other embodiments, the controller 170 can determine if a predetermined time interval has passed, the aftertreatment system 100 has operated for predetermined number of hours, fuel has been filled into the engine with which the aftertreatment system 100 is associated, or any other event has happened, and responsive to the event, command the liquid insertion assembly 120 to insert a predetermined quantity of the liquid into the SCR system 150. In particular embodiments, the controller 170 can also be configured to receive and interpret data from, temperature sensors, NOx sensors, oxygen sensors and/or ammonia sensors, each of which can be included in the aftertreatment system 100.

The controller 170 can include look up tables, algorithms or instructions, which can be stored on a computer readable medium (CRM) included in the controller 170. The instructions or algorithms on the CRM are executable by a computing device (e.g., the computing device 430) of the controller 170 (e.g., the microprocessor) specifically programmed to determine if a new catalyst assembly 154 is installed into the SCR system 150, or a predetermined time interval has passed, and command the liquid insertion assembly 120 to insert the liquid into the SCR system 150 to soak the catalyst assembly 154. In particular embodiments, the controller 170 can also be in electrical communication with the exhaust reductant storage tank 110, and include algorithms or instructions to control operations of the reductant storage tank 110 and/or an exhaust reductant insertion assembly (not shown) to control the flow of exhaust reductant into the SCR system 150.

In some embodiments, the controller 170 can be a system computer of an apparatus or system which includes the aftertreatment system 100 (e.g., a vehicle, generator set, etc.). Such a computer can include, for example the computing device 430 described in detail herein with respect to FIG. 5.

Figure 3:
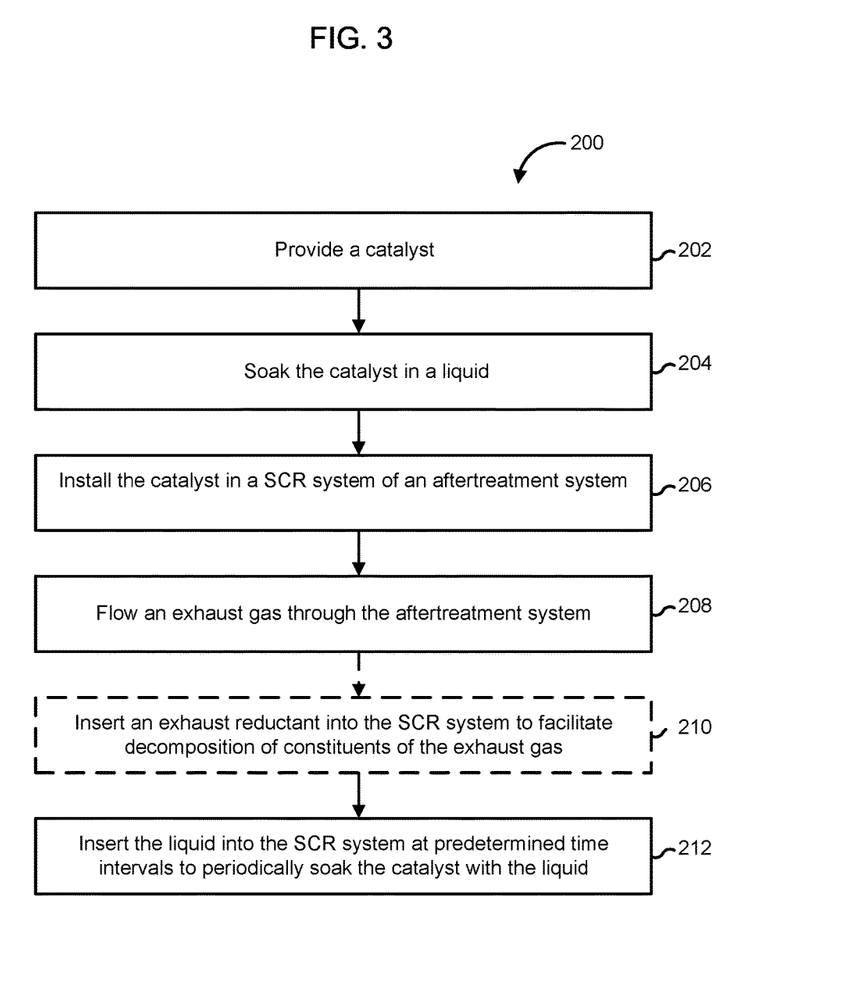
FIG. 3 is a schematic flow diagram of an embodiment of a method for improving a catalytic efficiency of a catalyst included in a catalyst assembly.

FIG. 3 is a schematic flow diagram of an example method 200 for improving a catalytic efficiency of a catalyst, for example, the catalyst included in the catalyst assembly 154 of the aftertreatment system 100. The method 200 includes providing a catalyst at 202. The catalyst can include, for example, the catalyst included in the catalyst assembly 154. In other embodiments, the catalyst may be provided integrated or prepackaged with a catalyst assembly (e.g., the catalyst assembly 154) received from a manufacturer. The catalyst can include a zeolite based catalyst such as, for example, a CuZ catalyst.

The catalyst is soaked in a liquid at 204. The liquid consists essentially of one of water or a water-comprising solution as described herein. For example, the as received new or fresh catalyst can be immersed in a bath of the liquid (e.g., water such as tap water, deionized water, filtered water, or a water-comprising solution such as water including a predetermined amount of minerals, salts or electrolytes, aqueous or basic solutions, and/or aqueous solutions of active catalyst components, etc.) to soak the catalyst. The catalyst may then be integrated into a catalyst assembly (e.g., the catalyst assembly 154). In other embodiments, the catalyst assembly may be soaked in the liquid so as to soak the catalyst included therein. In still other embodiments, the catalyst assembly can be sprayed or sprinkled with the liquid. In still other embodiments, liquid can be flown through the catalyst assembly. It is to be appreciated that the soaking of the catalyst with the liquid may occur before and/or after installing the catalyst or otherwise the catalyst assembly (e.g., the catalyst assembly 154) into the SCR system (e.g., the SCR system 150).

The soaking the catalyst with the liquid can be performed for a predetermined time, for example, 5-10 minutes, half an hour, 1 hour, 2 hours, 4 hours, 6 hours, 12 hours, 24 hours any other suitable time range in between or for an even longer time. The soaking with the liquid enhances the catalytic efficiency of the catalyst as described with respect to the aftertreatment system 100. In particular embodiments, the soaking with the liquid does not cause leaching of copper from the catalyst.

The soaked catalyst is installed in a SCR system of an aftertreatment system at 206, for example, the SCR system 150 of the aftertreatment system 100. For example, the catalyst may be soaked in the liquid, integrated into the catalyst assembly (e.g., the catalyst assembly 154), and the catalyst assembly installed in the SCR system 150. In some embodiments, the catalyst assembly can be a new catalyst assembly installed in a new aftertreatment system 100. In other embodiments, the catalyst assembly is a new catalyst assembly which is used to replace a failed catalyst assembly already present in an "in use" aftertreatment system i.e., an older aftertreatment system or an aftertreatment system that has been in operation for some time.

An exhaust gas is flown through the aftertreatment system at 208. The exhaust gas flows over the soaked catalyst assembly and the soaked catalyst disposed therein catalyzes the decomposition or otherwise reduction of constituents of the exhaust gas (e.g., NOx gases included in the exhaust gas) with a higher catalytic efficiency relative to an unsoaked catalyst. In some embodiments, an exhaust reductant is inserted into the SCR system to facilitate decomposition of the constituents of the exhaust gas at 210. The exhaust reductant can include, for example, a DEF such as urea, an aqueous urea solution, or any other exhaust reductant described herein.

In some embodiments, the liquid is inserted into the SCR system (e.g., the SCR system 150) at predetermined time intervals to periodically soak the catalyst of the catalyst assembly with the liquid at 212. For example, a liquid insertion assembly such as the liquid insertion assembly 120 described herein can be fluidly coupled to the SCR system and configured to insert the liquid into the SCR system (e.g., the SCR system 150) at predetermined intervals. In this manner, the catalyst assembly and thereby, the catalyst can be soaked with the liquid at predetermined time intervals. In some embodiments, the predetermined time intervals can occur after predetermined hours of operation, after each fuel refill of an engine (e.g., a diesel engine) with which the aftertreatment system is associated, or whenever a new catalyst assembly is installed in the aftertreatment system. In particular embodiments, the soaking with the liquid at the predetermined time intervals can also serve to regenerate the catalyst.

Figure 4:
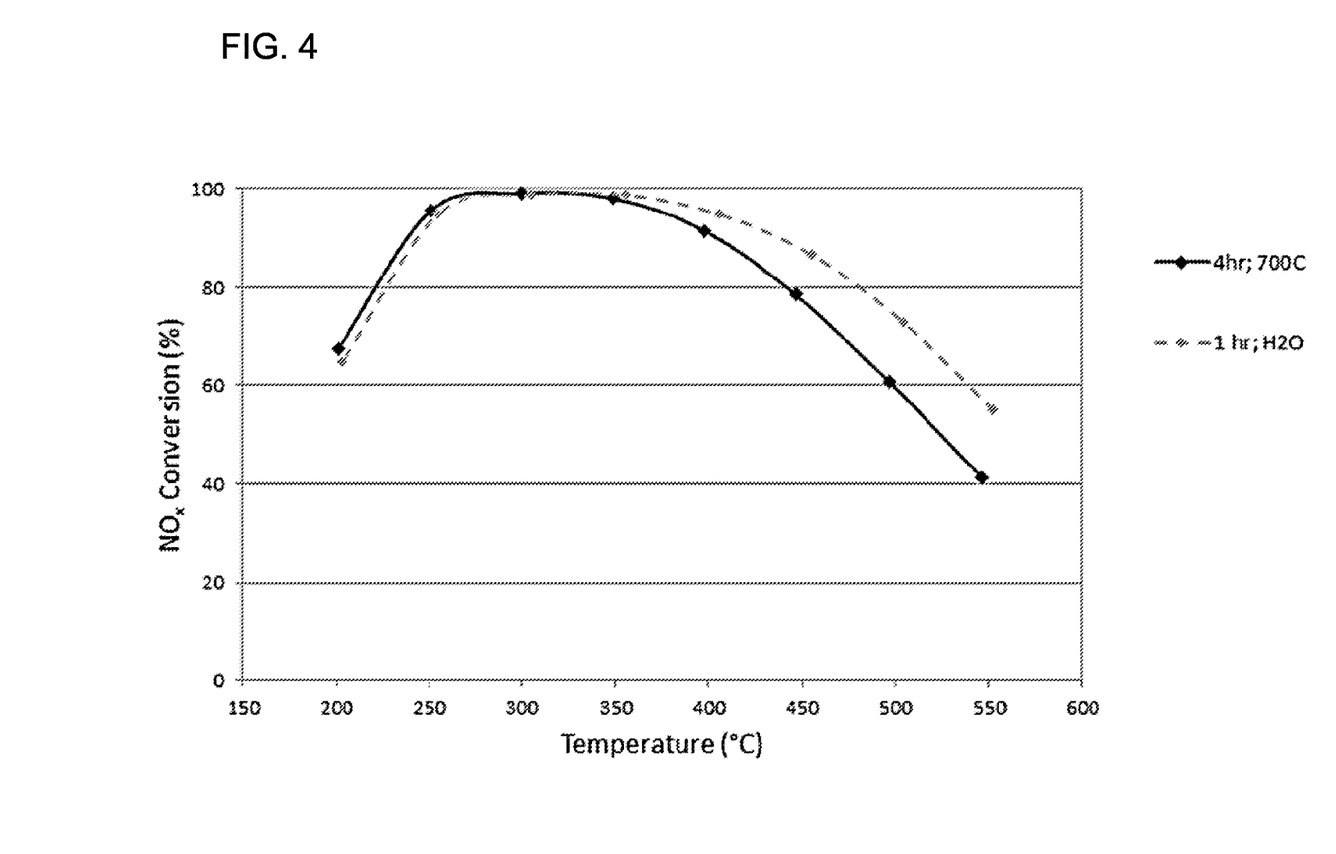
FIG. 4 is a plot of NOx conversion efficiency of a dry catalyst and a catalyst soaked with water at various temperatures.

FIG. 4 is a plot of NOx conversion efficiency of a CuZ catalyst soaked with water. As shown in FIG. 4, the water soaked CuZ catalyst provides an increase in NOx conversion efficiency in comparison to the unsoaked catalyst. Table I shows amount of leaching of components included in a CuZ catalyst composition after soaking with water and soaking with DEF. Soaking with water did not result in any leaching of copper from the catalyst. However, soaking with DEF resulted in 59 mg/L of copper leaching from the CuZ catalyst. Furthermore, soaking with DEF also resulted in substantially higher leaching of sodium silicate and silicon from the catalyst relative to water soaking. Thus, water soaking (or soaking with the liquid consisting essentially of one of water or a water-comprising solution) not only enhances the NOx conversion efficiency (i.e., catalytic efficiency) of the catalyst but also does not reduces the available catalytic component of the catalyst because of leaching.

TABLE I

Leaching of components of a catalyst due to water soaking and DEF soaking.

| Catalyst Component | Water (mg/L) | DEF (mg/L) |
|---|---|---|
| Aluminum | 0 | 0 |
| Sodium Tetraborate | 0 | 0 |
| Boron | 0 | 0 |
| Calcium | 0 | 1 |
| Copper | 0 | 59 |
| Iron | 0 | 0 |

TABLE I-continued

Leaching of components of a catalyst due to water soaking and DEF soaking.

| Catalyst Component | Water (mg/L) | DEF (mg/L) |
| --- | --- | --- |
| Magnesium | 0 | 0 |
| Sodium molybdate | 0 | 0 |
| Molybdenum | 0 | 0 |
| Lead | 0 | 0 |
| Sodium silicate | 130 | 222 |
| Silicon | 30 | 51 |
| Zinc | 0 | 0 |

Figure 5:
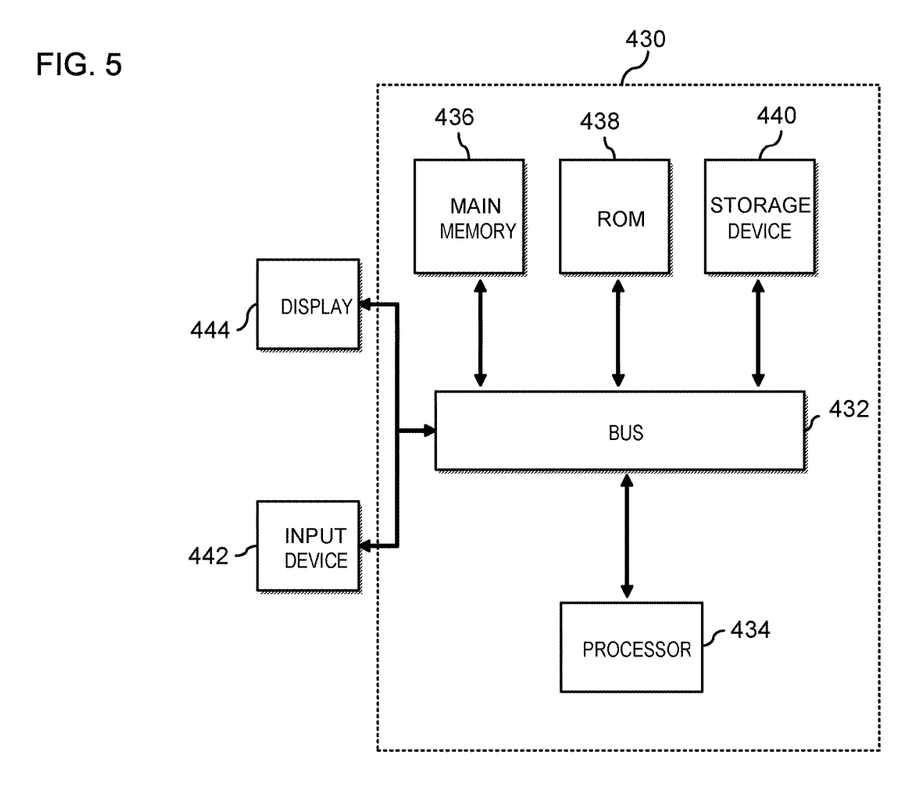
FIG. 5 is a schematic block diagram of a computing device which can be used as a controller included in the liquid insertion assembly of FIGS. 1 and 2.

FIG. 5 is a block diagram of a computing device 430 in accordance with an illustrative implementation. The computing device 430 can be used to perform any of the methods or the processes described herein, for example the method 200. In some embodiments, the controller 170 or 270 can include the computing device 430. The computing device 430 includes a bus 432 or other communication component for communicating information. The computing device 430 can also include one or more processors 434 or processing circuits coupled to the bus for processing information.

The computing device 430 also includes main memory 436, such as a random access memory (RAM) or other dynamic storage device, coupled to the bus 432 for storing information, and instructions to be executed by the processor 434. Main memory 436 can also be used for storing position information, temporary variables, or other intermediate information during execution of instructions by the processor 434. The computing device 430 may further include a read only memory (ROM) 438 or other static storage device coupled to the bus 432 for storing static information and instructions for the processor 434. A storage device 440, such as a solid-state device, magnetic disk or optical disk, is coupled to the bus 432 for persistently storing information and instructions. Instructions for commanding the liquid insertion assembly 120 for inserting the liquid into the SCR system 150 for soaking the catalyst assembly 154 can be stored on the storage device 440.

The computing device 430 may be coupled via the bus 432 to a display 435, such as a liquid crystal display, or active matrix display, for displaying information to a user. An input device 442, such as a keyboard or alphanumeric pad, may be coupled to the bus 432 for communicating information and command selections to the processor 434. In another implementation, the input device 442 has a touch screen display 444.

According to various implementations, the processes and methods described herein can be implemented by the computing device 430 in response to the processor 434 executing an arrangement of instructions contained in main memory 436 (e.g., the operations of the method 200). Such instructions can be read into main memory 436 from another non-transitory computer-readable medium, such as the storage device 440. Execution of the arrangement of instructions contained in main memory 436 causes the computing device 430 to perform the illustrative processes described herein. One or more processors in a multi-processing arrangement may also be employed to execute the instructions contained in main memory 436. In alternative implementations, hard-wired circuitry may be used in place of or in combination with software instructions to effect illustrative implementations. Thus, implementations are not limited to any specific combination of hardware circuitry and software.

Although an example computing device has been described in FIG. 5, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for increasing a catalytic efficiency of a catalyst, comprising:
   providing a catalyst;
   installing the catalyst into a selective catalytic reduction system of an aftertreatment system configured to reduce constituents of an exhaust gas generated by an engine, the aftertreatment system comprising a liquid insertion assembly and a controller operatively coupled to the liquid insertion assembly;
   determining, by the controller, that a new catalyst assembly is inserted into the selective catalytic reduction system; and
   in response to determining, by the controller, that the new catalyst assembly is inserted into the selective catalytic reduction system, instructing, by the controller, the liquid insertion assembly to soak the catalyst in a liquid, the liquid consisting essentially of one of water or a water-comprising solution, wherein the soaking occurs at least one of before or after installing the catalyst into the selective catalytic reduction system.

2. The method of claim 1, wherein the catalyst includes a copper zeolite catalyst.

3. The method of claim 1, wherein the catalyst is soaked in the liquid before installing the catalyst into the selective catalytic reduction system.

4. The method of claim 3, wherein the soaking with the liquid does not cause leaching of copper from the catalyst.

5. The method of claim 1, further comprising:
   integrating the catalyst into a catalyst assembly,
   wherein installing the catalyst comprises installing the catalyst assembly into the selective catalytic reduction system.

6. The method of claim 1, wherein the liquid consists essentially of the water-comprising solution, and wherein the water-comprising solution comprises at least one of an aqueous solution, a basic solution, and an aqueous solution of active catalyst components.

7. The method of claim 1, wherein the liquid consists essentially of the water-comprising solution, and wherein the water-comprising solution comprises a predetermined amount of at least one of a mineral, a salt, and an electrolyte.

8. The method of claim 1, further comprising:
   flowing the exhaust gas through the aftertreatment system; and inserting the liquid into the selective catalytic reduction system at predetermined time intervals, determined by the controller, to periodically soak the catalyst assembly with the liquid.

9. The method of claim 8, wherein the catalyst is not soaked in the liquid before installing the catalyst in the catalyst assembly.

10. The method of claim 8, further comprising:
inserting an exhaust reductant into the selective catalytic reduction system to facilitate reduction of constituents of the exhaust gas.

11. An aftertreatment system, comprising;
a selective catalytic reduction system comprising a catalyst assembly installed therein, the catalyst assembly comprising a catalyst configured to decompose constituents of an exhaust gas flowing through the aftertreatment system;
a liquid insertion assembly configured to deliver a liquid to the catalyst, the liquid consisting essentially of one of water or a water-comprising solution; and
a controller operatively coupled to the liquid insertion assembly;
wherein the controller is configured to determine that a new catalyst assembly is inserted into the selective catalytic reduction system and in response to determining, by the controller, that the new catalyst assembly is inserted into the selective catalytic reduction system instruct the liquid insertion assembly to soak the catalyst with the liquid at least one of before or after installing the catalyst assembly in the aftertreatment system.

12. The aftertreatment system of claim 11, wherein the catalyst includes a copper zeolite catalyst.

13. The aftertreatment system of claim 11, wherein the liquid insertion assembly is located separate from the selective catalytic reduction system, and wherein the controller is configured to instruct the liquid insertion assembly to soak the catalyst with the liquid before installing the catalyst into the selective catalytic reduction system.

14. The aftertreatment system of claim 11, wherein the liquid consists essentially of the water-comprising solution, and wherein the water-comprising solution comprises at least one of an aqueous solution, a basic solution, and an aqueous solution of active catalyst components.

15. The aftertreatment system of claim 11, wherein the liquid consists essentially of the water-comprising solution, and wherein the water-comprising solution comprises a predetermined amount of at least one of a mineral, a salt, and an electrolyte.

16. The aftertreatment system of claim 11, wherein the controller is further configured to instruct the liquid insertion assembly to insert the liquid into the selective catalytic reduction system at predetermined time intervals so as to periodically soak the catalyst assembly with the liquid.

17. The aftertreatment system of claim 16, wherein the predetermined time intervals comprise at least one of predetermined hours of operation of the aftertreatment system, a fuel refill of an engine associated with the aftertreatment system and installation of a new catalyst assembly in the aftertreatment system.

18. The aftertreatment system of claim 11, further comprising:
a reductant insertion assembly configured to insert an exhaust reductant into the selective catalytic reduction system to facilitate reduction of constituents of the exhaust gas.

19. An apparatus, comprising:
a selective catalytic reduction system structured to be operatively coupled to an aftertreatment system, the selective catalytic reduction system comprising:
a housing defining an inlet and an outlet;
a liquid insertion assembly;
a controller operatively coupled to the liquid insertion assembly; and
a catalyst assembly installed in the housing, the catalyst assembly comprising a catalyst configured to decompose constituents of an exhaust gas;
wherein the catalyst comprises a liquid soaked catalyst, the liquid in which the catalyst is soaked consisting essentially of one of water or a water-comprising solution; and
wherein the controller is configured determine that a new catalyst assembly is inserted into the selective catalytic reduction system and in response to determining, by the controller, that the new catalyst assembly is inserted into the selective catalytic reduction system instruct the liquid insertion assembly to soak the catalyst with the liquid at least one of before or after installing the catalyst assembly in the aftertreatment system.

20. The apparatus of claim 19, wherein the catalyst comprises a copper zeolite catalyst.

21. The apparatus of claim 19, wherein the liquid consists essentially of the water-comprising solution, and wherein the water-comprising solution comprises at least one of an aqueous solution, a basic solution, and an aqueous solution of active catalyst components.

22. The apparatus of claim 19, wherein the liquid consists essentially of the water-comprising solution, and wherein the water-comprising solution comprises a predetermined amount of at least one of a mineral, a salt, and an electrolyte.

23. The apparatus of claim 19, wherein the catalyst is soaked with the liquid before installing the catalyst assembly in the selective catalytic reduction system.

24. The apparatus of claim 19, wherein the catalyst is soaked with in the liquid after installing the catalyst assembly into the selective catalytic reduction system.

* * * * *